United States Patent
Zhao et al.

(10) Patent No.: US 11,312,660 B2
(45) Date of Patent: Apr. 26, 2022

(54) DENSE BORON NITRIDE CERAMIC WITH HIGH PLASTICITY AND HIGH ELASTICITY AND PREPARATION FOR THE SAME

(71) Applicant: YANSHAN UNIVERSITY, Qinhuangdao (CN)

(72) Inventors: Zhisheng Zhao, Qinhuangdao (CN); Yang Zhang, Qinhuangdao (CN); Yingju Wu, Qinhuangdao (CN); Shuangshuang Zhang, Qinhuangdao (CN); Wentao Hu, Qinhuangdao (CN); Dongli Yu, Qinhuangdao (CN); Julong He, Qinhuangdao (CN); Bo Xu, Qinhuangdao (CN); Zhongyuan Liu, Qinhuangdao (CN); Yongjun Tian, Qinhuangdao (CN)

(73) Assignee: YANSHAN UNIVERSITY, Qinhuangdao (CN)

( * ) Notice: Subject to any disclaimer, the term of this patent is extended or adjusted under 35 U.S.C. 154(b) by 0 days.

(21) Appl. No.: 16/829,362

(22) Filed: Mar. 25, 2020

(65) Prior Publication Data

US 2021/0061719 A1 Mar. 4, 2021

(30) Foreign Application Priority Data

Aug. 26, 2019 (CN) .......................... 201910791250.4

(51) Int. Cl.
*C04B 35/583* (2006.01)
(52) U.S. Cl.
CPC ...... *C04B 35/583* (2013.01); *C04B 2235/528* (2013.01); *C04B 2235/5445* (2013.01);
(Continued)

(58) Field of Classification Search
CPC ............ C04B 35/583; C04B 2235/528; C04B 2235/5445; C04B 2235/5454;
(Continued)

(56) References Cited

U.S. PATENT DOCUMENTS

2015/0226528 A1* 8/2015 Bottiglieri ............. F41H 5/0492
89/36.02

FOREIGN PATENT DOCUMENTS

CN 103569976 A 2/2014
CN 104086142 A 10/2014
(Continued)

OTHER PUBLICATIONS

CN 105481369 machine translation (Year: 2016).*
(Continued)

*Primary Examiner* — Karl E Group
*Assistant Examiner* — Cameron K Miller
(74) *Attorney, Agent, or Firm* — Maschoff Brennan; Brent A. Johnson; Yuefen Zhou

(57) ABSTRACT

The present disclosure relates to a dense boron nitride ceramic with high plasticity and high elasticity and the preparation process thereof. The preparation process includes the following steps: A) weighing a predetermined amount of spherical boron nitride nano-powders with onion-like structure, pre-pressing them into a pre-pressed body and putting the pre-pressed body into a sintering mold; B) putting the pre-pressed body obtained in step A) together with the sintering mold into a spark plasma sintering apparatus or a hot-pressing sintering apparatus for sintering; and C) taking out the mold after cooling, and removing the mold to obtain the boron nitride dense ceramic block with high plasticity and high elasticity. According to the present invention, a boron nitride ceramic with high strength and high
(Continued)

Figures 1A, 1B, 1C:
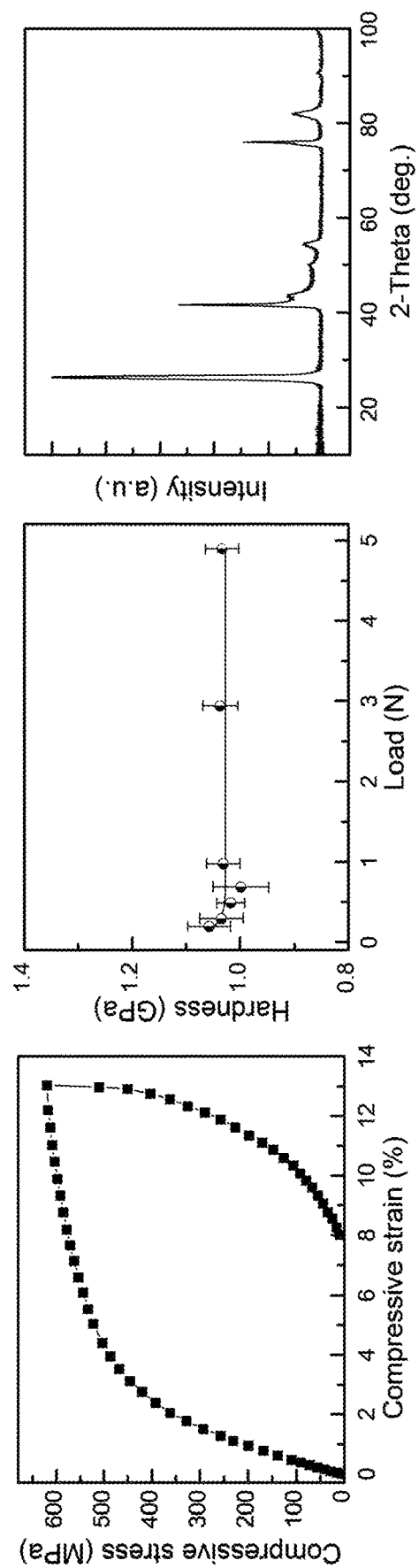

plasticity is obtained via sintering spherical boron nitride nano-powders with onion-like structure.

18 Claims, 5 Drawing Sheets

(52) U.S. Cl.
CPC .............. *C04B 2235/5454* (2013.01); *C04B 2235/6581* (2013.01); *C04B 2235/666* (2013.01); *C04B 2235/77* (2013.01); *C04B 2235/96* (2013.01)

(58) Field of Classification Search
CPC ...... C04B 2235/6581; C04B 2235/666; C04B 2235/77; C04B 2235/96
See application file for complete search history.

(56) References Cited

FOREIGN PATENT DOCUMENTS

| | | | |
|---|---|---|---|
| CN | 105481369 | * | 4/2016 |
| CN | 108529572 | * | 9/2018 |
| CN | 108529572 A | | 9/2018 |
| JP | 2009263147 A | | 11/2009 |

OTHER PUBLICATIONS

CN 108529572 machine translation (Year: 2018).*
Extended European Search Report for European Patent Application No. 20165135.3, dated Sep. 21, 2020.
The first Office Action issued by the China National Intellectual Property Administration (CNIPA) dated Mar. 18, 2020 for the Chinese Patent Application No. 201910791250.4.

* cited by examiner

DENSE BORON NITRIDE CERAMIC WITH HIGH PLASTICITY AND HIGH ELASTICITY AND PREPARATION FOR THE SAME

CROSS-REFERENCE TO RELATED APPLICATION

This application claims priority to Chinese Patent Application No. 201910791250.4, filed on Aug. 26, 2019, which is hereby incorporated by reference in its entirety.

TECHNICAL FIELD

The present disclosure relates to the preparation of plastic ceramics, in particular to a dense boron nitride ceramic with high plasticity and high elasticity and its preparation process.

BACKGROUND

Unlike metals, ceramics are brittle materials, have no plasticity at room temperature, and just exhibit a small elastic deformation. Generally the elastic deformation strain of ceramics is less than 1%. When the elastic limit is exceeded, cracks in the ceramic materials will rapidly expand and will instantly destroy the entire ceramic body, which hinders the extensive applications of ceramics in engineering. Hexagonal boron nitride (hBN) ceramics, as a typical ceramic material, have high thermal conductivity, low dielectric constant, excellent lubricity, corrosion resistance, high thermal stability, and excellent thermal shock resistance, which are very useful in metallurgy, electronics, chemical industry, aerospace and other fields. However, their low strength, low elasticity, and non-plasticity also limit their applications.

The crystal structure of hexagonal boron nitride is similar to that of graphite, in which the boron and nitrogen atoms in intralayer are connected by $sp^2$ covalent bond, and the interlayers are connected by weak Van der Waals force. Such type of layered crystal structure results in hexagonal boron nitride exhibiting poor sintering characteristics and sliding deformation under external force. High-purity hexagonal boron nitride ceramics obtained by traditional sintering processes has low strength, generally lower than 130 MPa, while exhibiting low elastic strain (less than 1%), and has no plastic deformation. For example, Chinese Patent Application No. 201410422994.6 discloses a process for pressureless sintering high-purity boron nitride ceramic, by which the prepared hexagonal boron nitride ceramic also has poor mechanical properties. The hexagonal boron nitride ceramic obtained in Example 1 has a room-temperature flexural strength of only 30.7 MPa, a Vickers hardness of only 0.08 GPa, and a fracture toughness of 0.69 MPa·$m^{1/2}$. The strength of hexagonal boron nitride composite ceramics containing sintering aid have a certain improvement through adding a sintering aid (e.g. $B_2O_3$, $Al_2O_3$, $ZrO_2$, CaO, SiAlON, $Si_3N_4$, AlN, SiC, YAG, $Y_2SiO_5$, Aluminum Silicate, etc.) However, the addition of the sintering aids would result in a decrease in the thermal conductivity, thermal shock resistance, and dielectric properties of hexagonal boron nitride composite ceramics, and the elasticity of ceramics has not been significantly improved, and the ceramics obtained also have no plasticity, as taught by Chinese Patent Application No. 201510683710.3 disclosing a process for preparing silicon nitride/hexagonal boron nitride nano-composite ceramics and Chinese Patent Application No. 201410833418.0 disclosing a process for preparing hexagonal boron nitride/silica nano-composite ceramic material.

SUMMARY

The technical problem to be solved by the present invention is to provide a boron nitride dense ceramic with high-plasticity and high-elasticity and its preparation process.

To solve the above technical problem, in one aspect, the present disclosure provides a dense boron nitride ceramic with high plasticity and high elasticity, characterized in that the ceramic has a room-temperature compressive strength of not less than about 400 MPa, a total room-temperature compressive strain of not less than about 9%, a room-temperature plastic strain of not less than about 4% and a room-temperature elastic strain of not less than about 4% (preferably not less than about 5%).

In another aspect, the present disclosure provides a preparation process for a dense boron nitride ceramic with high-plasticity and high-elasticity. The preparation process comprises the following steps:

A) Loading: weighing a predetermined amount of spherical boron nitride nano powders with onion-like structure, pre-pressing them into a pre-pressed body and putting the pre-pressed body into a sintering mold;

B) Sintering: Putting the pre-pressed body obtained in step A) together with the sintering mold into a spark plasma sintering apparatus or a hot-pressing sintering device for sintering;

C) Discharging: taking out the mold after cooling (e.g. by allowing the temperature in the apparatus to be naturally decreased to room temperature), and removing the mold to obtain a dense boron nitride ceramic block with high plasticity and high elasticity.

With the above technical solutions, a boron nitride dense ceramic with high-plasticity, high-strength and high-elasticity can be obtained.

DRAWINGS

Figure 2:
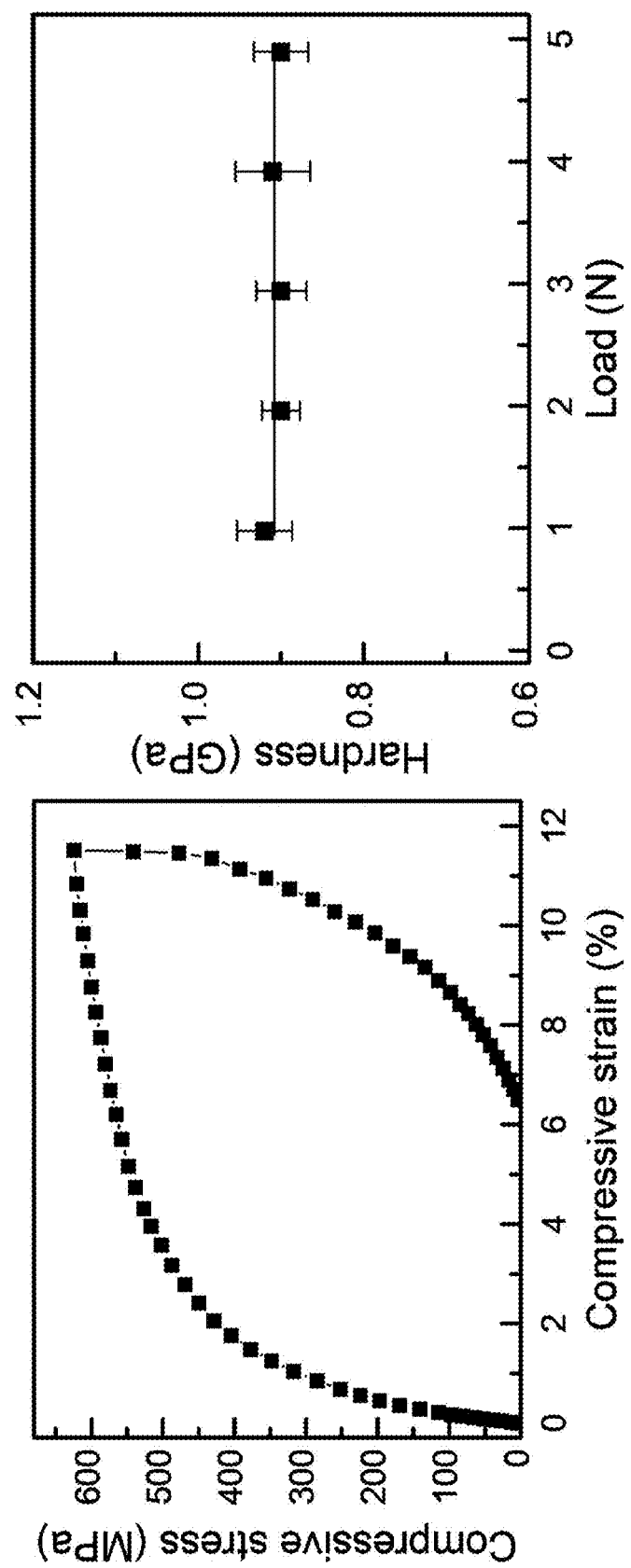
Figure 3:
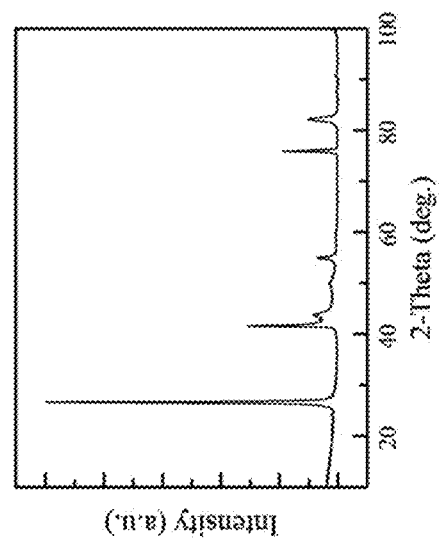
Figure 3:
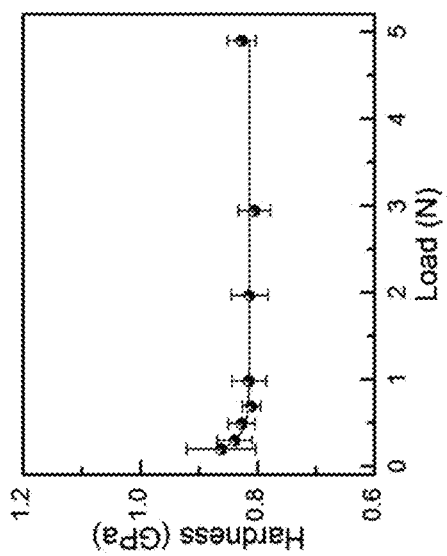
Figure 3:
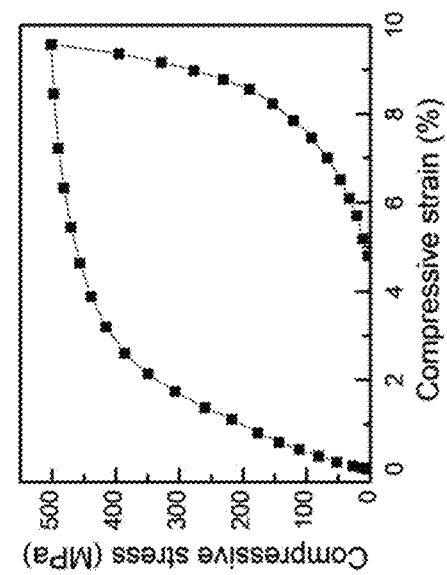
Figure 4:
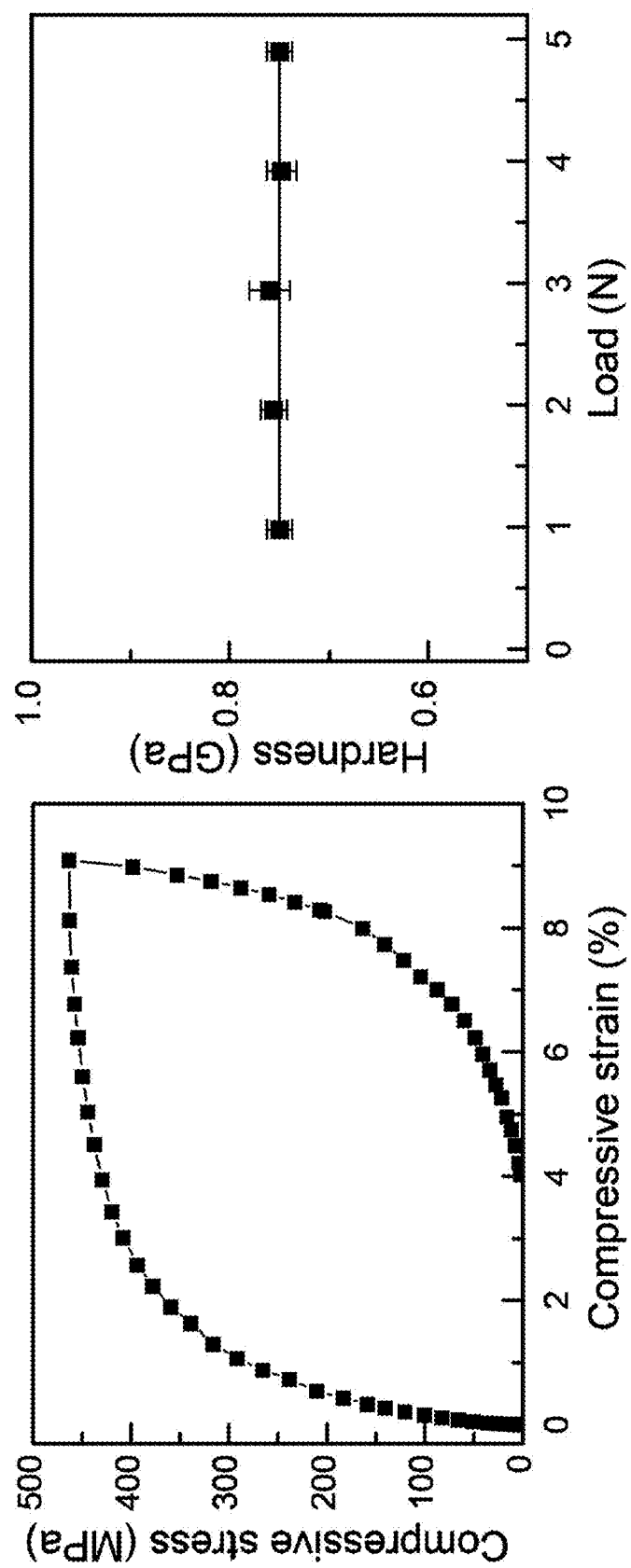
Figure 5:
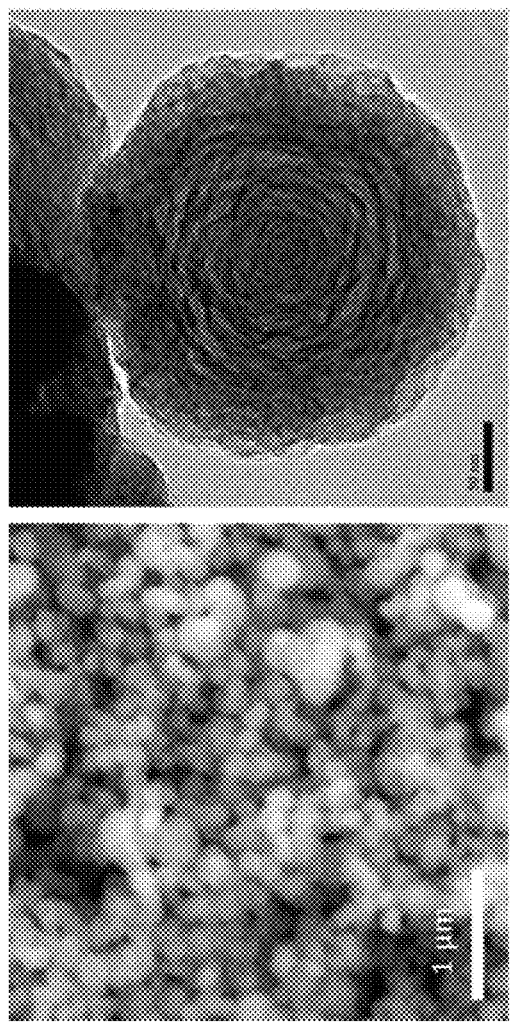

FIG. 1 A is the room-temperature uniaxial compression/decompression stress-strain curve of the product prepared in Example 1 of the present invention; FIG. 1 B is the Vickers hardness of the product prepared in Example 1 of the present invention as a function of load; FIG. 1 C is the X-ray diffraction pattern of the product prepared in Example 1 of the present invention;

FIG. 2 A is the room-temperature uniaxial compression/decompression stress-strain curve of the product prepared in Example 2 of the present invention; FIG. 2 B is the Vickers hardness of the product prepared in Example 2 of the present invention as a function of load;

FIG. 3 A is the room-temperature uniaxial compression/decompression stress-strain curve of the product prepared in Example 3 of the present invention; FIG. 3 B is the Vickers hardness of the product prepared in Example 3 of the present invention as a function of load;

FIG. 3 C is the X-ray diffraction pattern of the product prepared in Example 3 of the present invention;

FIG. 4 A is the room-temperature uniaxial compression/decompression stress-strain curve of the product prepared in Example 4 of the present invention; FIG. 4 B is the Vickers hardness of the product prepared in Example 4 of the present invention as a function of load;

FIG. 5 A is the morphology image of spherical boron nitride nano-powders with onion-like structure used in Examples 1 to 5 of the present invention, and FIG. 5 B is the high-resolution transmission electron microscopy image of spherical boron nitride nano-powders with onion-like structure used in Examples 1 to 5 of the present invention.

DETAILED DESCRIPTION

As used herein, the articles "a", "an" and "the" may include plural referents unless otherwise expressly limited to one-referent, or if it would be obvious to a skilled artisan from the context of the sentence that the article refers to a singular referent.

Where a numerical range is disclosed herein, then such a range is continuous, inclusive of both the minimum and maximum values of the range, as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all subranges subsumed therein. For example, a stated range of from "1 to 10" should be considered to include any and all subranges between the minimum value of 1 and the maximum value of 10. In addition, every point or individual disclosed herein value may serve as a lower or upper limit combined with any other point or individual value or any other lower or upper limit disclosed herein, to form a range not explicitly recited herein, which range will be covered by the protection scope of the attached claims.

The present disclosure provides a dense boron nitride ceramic with high plasticity and high elasticity, characterized in that the ceramic has a room-temperature compressive strength of not less than about 400 MPa, a total room-temperature compressive strain of not less than about 9%, a room-temperature plastic strain of not less than about 4% and a room-temperature elastic strain of not less than about 4% (preferably not less than about 5%).

As used herein, the term "about" means plus or minus a percent (e.g., ±5%) of the number, parameter, or characteristic so qualified, which would be understood as appropriate by a skilled artisan to the scientific context in which the term is utilized. Furthermore, since all numbers, values, and expressions referring to quantities used herein, are subject to the various uncertainties of measurement encountered in the art, and then unless otherwise indicated, all presented values may be understood as modified by the term "about."

As used herein, the term "high plasticity" when used in reference to a ceramic, means the ceramic has a room-temperature plastic strain of not less than about 3%, preferably not less than about 4% and more preferably not less than about 5%.

As used herein, the term "high elasticity" when used in reference to a ceramic, means the ceramic has a room-temperature elastic strain of not less than about 3%, preferably not less than about 4% and more preferably not less than about 5%.

As used herein, the term "dense" when used in reference to a ceramic, means the relative density of the ceramic, calculated as the ratio of the measured density relative to its theoretical density, is not less than about 85%, preferably not less than about 90%, more preferably not less than about 92% and most preferably not less than about 94%.

The dense boron nitride ceramic with high plasticity and high elasticity can be obtained by a preparation process comprising the following steps:

A) Weighing a predetermined amount of spherical boron nitride nano powders with onion-like structure, pre-pressing them into a pre-pressed body and putting the pre-pressed body into a sintering mold;

B) Putting the pre-pressed body obtained in step A) together with the sintering mold into a spark plasma sintering apparatus or a hot-pressing sintering device for sintering;

C) Taking out the mold after cooling (e.g. by allowing the temperature in the apparatus to be naturally decreased to room temperature), and removing the mold to obtain the dense boron nitride ceramic with high plasticity and high elasticity as a block.

Spherical boron nitride nano-powders with onion-like structure are used in the preparation process. On one hand, the spherical boron nitride nano powders have better fluidity than lamellar hexagonal boron nitride powders, which promotes gap filling during sintering and is beneficial to obtain the dense sintered body at relatively low sintering temperature. On the other hand, boron nitride with onion-like structure contains a large amount of wrinkles inside, and it is easy to form $sp^3$ bonds during compression, which increases the strength of the sintered body.

Pre-pressing molding in step A) may be preferably carried out by applying pressure in two directions. Applying pressure in two directions can exert bidirectional stress on the spherical boron nitride nano-powders with onion-like structure within the pre-pressing mold, which reduces pressure gradient on the body and prevents technical problems caused by unidirectional applying pressure, including the large density difference between the upper and lower pre-pressed body (caused by the pressure gradient) and the overall density difference of the post-sintering block. In addition, applying pressure in two directions can also compress the powders more densely, which is conducive to the subsequent sintering of the pre-pressed body.

The periphery of the graphite mold may be preferably wrapped with a carbon felt. The carbon felt surrounds gaps present in the graphite mold, which can reduce heat diffusion of the graphite mold and reduce temperature gradient inside the graphite mold, thereby avoiding uneven microstructure and mechanical properties of the sintered body.

The sintering pressure may be preferably set to 30 MPa-50 MPa. Within this pressure range, it is possible to ensure that a dense sintered body can be obtained at relatively low sintering temperature. As the applied pressure is relatively small, it can reduce industrial cost and facilitate industrial mass production. At the same time, the pressure range can control phase transition speed of the spherical boron nitride nano-powder with onion-like structure and prevent grains from growing too fast.

In a preferred embodiment, the sintering mold in step A) is a graphite mold wrapped with a carbon felt.

In a preferred embodiment, the pre-pressing in step A) is carried out by applying pressure in two directions at a pressure of 2 MPa to 5 MPa with a pressure holding time of 1 min to 5 min.

In a preferred embodiment, the spherical boron nitride nano powders with onion-like structure in step A) have a particle size of 10 nm to 1000 nm.

In a preferred embodiment, the sintering step in step B) comprises evacuating to a vacuum degree not less than $1 \times 10^{-1}$ Pa, increasing the pressure to a sintering pressure, increasing the temperature to a sintering temperature after the sintering pressure reaches a steady state, carrying out high-temperature sintering, and then stopping heating and releasing pressure.

In a preferred embodiment, the sintering step in step B) is carried out at a pressure of 30 MPa to 50 MPa and a temperature of 1600° C. to 2000° C. with a holding time of 1 min to 30 min.

In a preferred embodiment, the sintering step in step B) is spark plasma sintering or hot-pressing sintering.

In a preferred embodiment, the temperature in step B) is increased at a rate of 20° C./min to 100° C./min.

The present disclosure also provides a dense boron nitride ceramic with high-plasticity and high-elasticity prepared by the above preparation process, which has the room-temperature compressive strength of not less than about 400 MPa, the room-temperature total compressive strain of not less than about 9%, the room-temperature plastic strain of not less than about 4% and a room-temperature elastic strain of not less than about 5%.

With the above technical solutions, a dense boron nitride ceramic with high-plasticity, high-strength and high-elasticity can be obtained.

The present disclosure provides a dense boron nitride ceramic with high-strength, high-plasticity and high-elasticity and the preparation process thereof whereby boron nitride ceramics with high-strength, high-plasticity and high-elasticity have been obtained via sintering spherical boron nitride nano-powders with onion-like structure.

The following non-limiting examples illustrate certain aspects of the present disclosure.

EXAMPLES

The present invention will be described in further details below with reference to the drawings and specific examples.

Example 1

The present example is a process for the preparation of a dense boron nitride ceramic with high-plasticity and high-elasticity, including the following steps.

A) Loading: 7 grams of spherical boron nitride nano-powders with onion-like structure were weighted, wherein the spherical boron nitride nano-powders with onion-like structure had a particle size of 10 nm to 1000 nm, and then were pre-pressed into a pre-pressed body by applying pressure in two directions. In particular, the spherical boron nitride nano-powders with onion-like structure were placed in a pre-pressing mold and then a pressure of 5 MPa was applied for a holding time of 1 min, wherein the pre-pressing mold was a circular stainless steel mold with an inner diameter of 20 mm. The obtained pre-pressed body was put into a sintering mold wherein the sintering mold was a graphite mold, and the periphery of the graphite mold was wrapped with carbon felt.

B) Sintering: The pre-pressed body in step A) together with the sintering mold was put into a spark plasma sintering apparatus for sintering. The sintering was spark plasma sintering comprising the following steps: evacuating to a vacuum degree of $1 \times 10^{-1}$ Pa, increasing the pressure to a sintering pressure of 50 MPa, increasing the temperature to a sintering temperature of 1600° C. at a rate of 100° C./min after the sintering pressure reaches a steady state, keeping the temperature for 5 min, and then stopping heating and releasing pressure. In the sintering step, it is possible to increase the pressure to the sintering pressure without evacuation, but it is preferable to perform evacuation. The pre-pressed body usually contains a certain amount of pores, wherein water vapor, hydrogen, and oxygen can escape from the closed pores through dissolution and diffusion process while carbon monoxide, carbon dioxide, and nitrogen are not easy to escape from the closed pores due to their low solubility. Therefore, the pre-pressed body is preferably placed under vacuum conditions. The higher the vacuum degree, the more the gas can escape from the closed pores, which can increase the density of the final product. However, if the vacuum degree is too high, it may take too long to perform evacuation, which increases the production cost. Therefore, in all the examples of the present invention, it is evacuated to a vacuum degree of $1 \times 10^{-1}$ Pa followed by increasing pressure to a sintering pressure.

The spark plasma sintering apparatus used in this example was SPS-3.20MK-IV of Sumitomo Carbon Mining Co., Ltd., and the hot-pressing sintering equipment used in the subsequent examples was HIGH-MULTI-5000 of Fuji Dempa Kogyo Co., Ltd. of Japan.

C) Discharging: The mold was taken out after the temperature in the apparatus was naturally reduced to room temperature, and the mold was removed to obtain the dense boron nitride ceramic block with high plasticity and high elasticity.

The prepared products of boron nitride compact ceramic block with high plasticity and high elastic plasticity were measured with a testing machine for mechanical properties of materials to obtain their compressive strength and plastic strain. Various performance tests were performed at room temperature. The test samples were cylinders with a diameter of 3 mm and a height of 4.5 mm. The strain rate applied by the mechanical property testing machine was $1 \times 10^{-5}$ to $1 \times 10^{-2}$. Micro-hardness tester KB-SBVZ produced by KB Prüftechnik GmbH, Germany was used for hardness tests. The Vickers indenter was used to test the high-strength high-plasticity boron nitride ceramic blocks in which the used load was 20 g-500 g and the load was maintained for 30 s. An asymptotic hardness value was fitted by measuring hardness at different loads. That is, the hardness of the test sample was the hardness indicated by the asymptotic line.

FIG. 1 A shows a room-temperature uniaxial compression/decompression stress-strain curve of the product prepared in Example 1 of the present invention, and the compressive strength of the sample was 620 MPa. The stress-strain curve presented obvious nonlinear characteristics, in which the plastic deformation strain was 8%, the elastic strain was 5%, and the total compressive strain was 13%. As shown in FIG. 1 B, the Vickers hardness of the product was 1.04 GPa. As shown in FIG. 1 C, X-ray diffraction pattern of the product prepared in Example 1 of the present invention, the sintered body was not completely graphitized in structure and had a hexagonal boron nitride-like structure. The density of the sintered body of Example 1 was 2.10 g/cm' as measured by the drainage method based on Archimedes' principle. The relative density, calculated as the ratio of the measured density relative to the theoretical density, was 96%.

Example 2

This example is a process for the preparation of a high-plasticity and high-elasticity dense boron nitride ceramic. Its process steps are similar to those of Example 1, and the difference between Example 2 and Example 1 in the process parameters is shown in Table 1.

As shown in FIG. 2 A, a room-temperature uniaxial compression/decompression stress-strain curve of the product prepared in Example 2 of the present invention, the compressive strength of sample was 614 MPa. The stress-strain curve presented obvious nonlinear characteristics, in which the plastic deformation strain was 6.3%, the elastic strain was 4.9%, and the total compressive strain was 11.2%. As shown in FIG. 2 B, the Vickers hardness of the product was 0.91 GPa. The product of Example 2 had similar crystalline structure as that of Example 1. The density of the sintered body of Example 2 was 2.09 g/cm$^3$ as measured by the drainage method based on Archimedes' principle. The relative density, calculated as the ratio of the measured density relative to the theoretical density, was 95.4%.

Example 3

This example is a process for the preparation of a high-plasticity and high-elasticity dense boron nitride ceramic. Its process steps are similar to those of Example 1, and the difference between Example 3 and Example 1 in the process parameters is shown in Table 1.

As shown in FIG. 3 A, a room-temperature uniaxial compression/decompression stress-strain curve of the product prepared in Example 3 of the present invention, the compressive strength of sample was 501 MPa. The stress-strain curve presented obvious nonlinear characteristics, in which the plastic deformation strain was 4.8%, the elastic strain was 4.8%, and the total compressive strain was 9.6%. As shown in FIG. 3 B, the Vickers hardness of the product was 0.81 GPa. As shown in FIG. 3 C, X-ray diffraction pattern of the product prepared in Example 3 of the present invention, the sintered body was not completely graphitized in structure and had a hexagonal boron nitride-like structure similar to Example 1. The density of the sintered body of Example 3 was 2.07 g/cm$^3$ as measured by the drainage method based on Archimedes' principle. The relative density, calculated as the ratio of the measured density relative to the theoretical density, was 95%.

Example 4

This example is a process for the preparation of a high-plasticity and high-elasticity dense boron nitride ceramic. Its process steps are similar to those of Example 1, and the difference between Example 4 and Example 1 in the process parameters is shown in Table 1.

As shown in FIG. 4 A, a room-temperature uniaxial compression/decompression stress-strain curve of the product prepared in Example 4 of the present invention, the compressive strength of sample was 460 MPa. The stress-strain curve presented obvious nonlinear characteristics, in which the plastic deformation strain was 4%, the elastic strain was 5.1%, and the total compressive strain was 9.1%. As shown in FIG. 4 B, the Vickers hardness of the product was 0.75 GPa. The product of Example 4 had similar crystalline structure as that of Example 1. The density of the sintered body of Example 4 was 2.07 g/cm$^3$ as measured by the drainage method based on Archimedes' principle. The relative density, calculated as the ratio of the measured density relative to the theoretical density, was 95%.

TABLE 1

Comparison of process parameters for preparing high-plasticity and high-elasticity dense boron nitride ceramics in Examples 1 to 4

| | | Examples | | | |
|---|---|---|---|---|---|
| Parameters | | 1 | 2 | 3 | 4 |
| Step A | Pre-pressing Pressure (MPa) | 5 | 2 | 5 | 2 |
| | Holding time (min) | 1 | 3 | 1 | 3 |
| Step B | Sintering means | Spark plasma sintering | Hot-pressing sintering | Spark plasma sintering | Hot-pressing sintering |
| | Sintering pressure (MPa) | 50 | 30 | 50 | 30 |
| | Heating rate (° C./min) | 100 | 20 | 100 | 20 |
| | Sintering temperature (° C.) | 1600 | 1600 | 1600 | 1800 |
| | Holding time (min) | 5 | 10 | 20 | 10 |

TABLE 2

Performance of the high-plasticity and high-elasticity dense boron nitride ceramics in Examples 1 to 4.

| | Examples | | | |
|---|---|---|---|---|
| Performance | 1 | 2 | 3 | 4 |
| Density (g/cm$^3$) | 2.10 | 2.09 | 2.07 | 2.07 |
| Relative density | 96% | 95.4% | 95% | 95% |
| Compressive strength (MPa) | 620 | 614 | 501 | 460 |
| Total compressive strain | 13% | 11.2% | 9.6% | 9.1% |
| Plastic strain | 8% | 6.3% | 4.8% | 4% |
| Elastic strain | 5% | 4.9% | 4.8% | 5.1% |
| Vickers hardness (GPa) | 1.04 | 0.91 | 0.81 | 0.75 |

Certain embodiments are described herein, including preferred embodiments known to the inventors, but the scope of the present disclosure is not limited to these embodiments. Of course, equivalent variations on these described embodiments based on structure, shape, principle and the like will become apparent to those of ordinary skill in the art upon reading the foregoing description and will be covered by the scope of the attached claims.

The present disclosure enumerates alternative materials for each component. It is to be understood that the recited list serves only as a representative group and should not be interpreted as an exclusive list. Other materials not mentioned in the disclosure may be used for achieving the purpose of the present disclosure. The embodiments disclosed herein are illustrative of the principles of the embodiments. Thus, by way of example, but not of limitation, alternative embodiments may be utilized in accordance with the teachings herein.

In addition, every point or individual value may serve as its own lower or upper limit combined with any other point or individual value or any other lower or upper limit, to recite a range not explicitly recited, which range will be covered by the protection scope of the attached claims. Moreover, any combination of the above-described elements in all possible variations thereof is contemplated as falling into the protection scope of the attached claims.

The invention claimed is:

1. A boron nitride ceramic, wherein the ceramic has a room-temperature compressive strength of not less than about 400 MPa, a total room-temperature compressive strain of not less than about 9%, a room-temperature plastic strain of not less than about 4%, a room-temperature elastic strain of not less than about 4%, and a relative density, calculated as the ratio of the measured density relative to its theoretical density, of not less than about 85%.

2. The boron nitride ceramic as claimed in claim 1, wherein its room-temperature elastic strain is not less than about 5%.

3. A process for the preparation of a boron nitride ceramic according to claim 1, comprising the following steps:
   A) Weighing a predetermined amount of spherical boron nitride nano-powders with onion-like structure, pre-pressing them into a pre-pressed body and putting the pre-pressed body into a sintering mold;
   B) Putting the pre-pressed body obtained in step A) together with the sintering mold into a spark plasma sintering apparatus or a hot-pressing sintering apparatus for sintering; and
   C) Taking out the mold after cooling, and removing the mold to obtain the boron nitride ceramic block.

4. The process for the preparation of a boron nitride ceramic as claimed in claim 3, wherein the cooling operation in step C) is effected by allowing the temperature in the apparatus of B) to be naturally decreased to room temperature.

5. The process for the preparation of a boron nitride ceramic as claimed in claim 3, wherein the sintering mold in step A) is a graphite mold wrapped with a carbon felt.

6. The process for the preparation of a boron nitride ceramic as claimed in claim 4, wherein the sintering mold in step A) is a graphite mold wrapped with a carbon felt.

7. The process for the preparation of a boron nitride ceramic as claimed in claim 3, wherein the pre-pressing in step A) is carried out by applying pressure in two directions at a pressure of 2 MPa to 5 MPa with a pressure holding time of 1 min to 5 min.

8. The process for the preparation of a boron nitride ceramic as claimed in claim 4, wherein the pre-pressing in step A) is carried out by applying pressure in two directions at a pressure of 2 MPa to 5 MPa with a pressure holding time of 1 min to 5 min.

9. The process for the preparation of a boron nitride ceramic as claimed in claim 3, wherein the spherical boron nitride nano-powders with onion-like structure used in step A) have a particle size of 10 nm to 1000 nm.

10. The process for the preparation of a boron nitride ceramic as claimed in claim 4, wherein the spherical boron nitride nano-powders with onion-like structure used in step A) have a particle size of 10 nm to 1000 nm.

11. The process for the preparation of a boron nitride ceramic as claimed in claim 3, wherein the sintering step in step B) comprises evacuating to a vacuum degree not less than $1 \times 10^{-1}$ Pa, pressurizing to a sintering pressure, heating to a sintering temperature after the sintering pressure reaches a steady state, carrying out high-temperature sintering, and then stopping heating and releasing pressure.

12. The process for the preparation of a boron nitride ceramic as claimed in claim 4, wherein the sintering step in step B) comprises evacuating to a vacuum degree not less than $1 \times 10^{-1}$ Pa, pressurizing to a sintering pressure, heating to a sintering temperature after the sintering pressure reaches a steady state, carrying out high-temperature sintering, and then stopping heating and releasing pressure.

13. The process for the preparation of a boron nitride ceramic as claimed in claim 11, wherein the temperature in step B) is increased at a rate of 20° C./min to 100° C./min.

14. The process for the preparation of a boron nitride ceramic as claimed in claim 12, wherein the temperature in step B) is increased at a rate of 20° C./min to 100° C./min.

15. The process for the preparation of a boron nitride ceramic as claimed in claim 3, wherein the sintering step in step B) is carried out at a sintering pressure of 30 MPa to 50 MPa and a sintering temperature of 1600° C. to 2000° C. with a holding time of 1 min to 30 min.

16. The process for the preparation of a boron nitride ceramic as claimed in claim 4, wherein the sintering step in step B) is carried out at a sintering pressure of 30 MPa to 50 MPa and a sintering temperature of 1600° C. to 2000° C. with a holding time of 1 min to 30 min.

17. The process for the preparation of a boron nitride ceramic as claimed in claim 3, wherein the ceramic has a room-temperature compressive strength of not less than about 400 MPa, a total room-temperature compressive strain of not less than about 9%, a room-temperature plastic strain of not less than about 4% and a room-temperature elastic strain of not less than about 4%.

18. The process for the preparation of a boron nitride ceramic as claimed in claim 4, wherein the ceramic has a room-temperature compressive strength of not less than about 400 MPa, a total room-temperature compressive strain of not less than about 9%, a room-temperature plastic strain of not less than about 4% and a room-temperature elastic strain of not less than about 4%.

* * * * *